(12) United States Patent
Döring et al.

(10) Patent No.: US 11,350,077 B2
(45) Date of Patent: May 31, 2022

(54) HANDHELD THREE DIMENSIONAL SCANNER WITH AN AUTOAPERTURE

(71) Applicant: FARO Technologies, Inc., Lake Mary, FL (US)

(72) Inventors: Daniel Döring, Ditzingen (DE); Martin Ossig, Tamm (DE); Gerrit Hillebrand, Waiblingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 17/237,547

(22) Filed: Apr. 22, 2021

(65) Prior Publication Data

US 2021/0243423 A1 Aug. 5, 2021

Related U.S. Application Data

(62) Division of application No. 16/445,401, filed on Jun. 19, 2019, now abandoned.

(Continued)

(51) Int. Cl.
| | |
|---|---|
| *H04N 13/246* | (2018.01) |
| *H04N 13/254* | (2018.01) |
| *H04N 13/239* | (2018.01) |
| *G02B 7/09* | (2021.01) |
| *G02B 7/36* | (2021.01) |

(Continued)

(52) U.S. Cl.
CPC ............ *H04N 13/246* (2018.05); *G02B 7/09* (2013.01); *G02B 7/36* (2013.01); *G03B 7/095* (2013.01); *G03B 13/36* (2013.01); *H04N 13/239* (2018.05); *H04N 13/254* (2018.05)

(58) Field of Classification Search
CPC .. H04N 13/246; H04N 13/239; H04N 13/254; G02B 7/09; G02B 7/36; G03B 7/095; G03B 13/36; G03B 35/08; G01C 11/025; G01C 25/00

See application file for complete search history.

(56) References Cited

U.S. PATENT DOCUMENTS

| | | |
|---|---|---|
| 5,978,081 A | 11/1999 | David et al. |
| 6,215,498 B1 | 4/2001 | Filo et al. |

(Continued)

FOREIGN PATENT DOCUMENTS

| | | |
|---|---|---|
| AT | 506110 A1 | 6/2009 |
| CN | 104614385 A | 5/2015 |

(Continued)

OTHER PUBLICATIONS

Su et al.; "Aspheric and freeform surfaces metrology with software configurable optical test system: a computerized reverse Hartmann test"; Optical Engineering, vol. 53(3), 031305 (Mar. 2014) (Year: 2014).

(Continued)

*Primary Examiner* — Christopher Wait
(74) *Attorney, Agent, or Firm* — Cantor Colburn LLP

(57) ABSTRACT

A three-dimension scanning apparatus and method of use is disclosed. The system includes a light intensity meter for measuring a level of light intensity at a first camera of the 3D scanning apparatus. The first camera has an adjustable aperture. A processor is provided that is configured to adjust the adjustable aperture of the first camera automatically based on the measured light level.

15 Claims, 9 Drawing Sheets

Related U.S. Application Data

(60) Provisional application No. 62/693,628, filed on Jul. 3, 2018.

(51) Int. Cl.
*G03B 7/095* (2021.01)
*G03B 13/36* (2021.01)

(56) References Cited

U.S. PATENT DOCUMENTS

| | | | |
|---|---|---|---|
| 7,047,151 | B2 | 5/2006 | Chang |
| 7,259,747 | B2 | 8/2007 | Bell |
| 8,355,041 | B2 | 1/2013 | Chen et al. |
| 8,937,657 | B2 | 1/2015 | Klass |
| 9,196,067 | B1 | 11/2015 | Freed |
| 9,242,171 | B2 | 1/2016 | Newcombe et al. |
| 9,372,265 | B2 | 6/2016 | Zweigle et al. |
| 9,383,587 | B2 | 7/2016 | Balogh |
| 9,602,811 | B2 | 3/2017 | Hillebrand et al. |
| 9,671,221 | B2 | 6/2017 | Ruhland et al. |
| 9,693,040 | B2 | 6/2017 | Hillebrand et al. |
| 9,769,463 | B2 | 9/2017 | Hillebrand et al. |
| 9,915,521 | B2 | 3/2018 | Hillebrand et al. |
| 10,831,093 | B1 * | 11/2020 | Lablans ............ G03B 30/00 |
| 2002/0015934 | A1 | 2/2002 | Rubbert et al. |
| 2005/0134961 | A1 | 6/2005 | Beisch et al. |
| 2007/0097381 | A1 | 5/2007 | Tobiason et al. |
| 2007/0171220 | A1 | 7/2007 | Kriveshko |
| 2007/0172112 | A1 | 7/2007 | Paley et al. |
| 2008/0201101 | A1 | 8/2008 | Hebert et al. |
| 2010/0034426 | A1 | 2/2010 | Takiguchi et al. |
| 2010/0095542 | A1 | 4/2010 | Ferrari |
| 2010/0134598 | A1 | 6/2010 | St-Pierre et al. |
| 2010/0134599 | A1 | 6/2010 | Billert et al. |
| 2010/0198565 | A1 | 8/2010 | Jayaram et al. |
| 2010/0259636 | A1 | 10/2010 | Tzur et al. |
| 2011/0107611 | A1 | 5/2011 | Desforges et al. |
| 2011/0134225 | A1 | 6/2011 | Saint-Pierre et al. |
| 2011/0164037 | A1 | 7/2011 | Yoshida et al. |
| 2011/0188739 | A1 | 8/2011 | Lee et al. |
| 2012/0033069 | A1 | 2/2012 | Becker et al. |
| 2012/0062557 | A1 | 3/2012 | Dillon et al. |
| 2012/0223885 | A1 | 9/2012 | Perez |
| 2012/0327083 | A1 | 12/2012 | Nishimura et al. |
| 2013/0155058 | A1 | 6/2013 | Golparvar-Fard et al. |
| 2013/0218024 | A1 | 8/2013 | Boctor et al. |
| 2013/0335417 | A1 | 12/2013 | Mcqueston et al. |
| 2014/0015963 | A1 | 1/2014 | Klaas |
| 2014/0028805 | A1 | 1/2014 | Tohme |
| 2014/0120493 | A1 | 5/2014 | Levin |
| 2014/0125772 | A1 | 5/2014 | Myokan et al. |
| 2014/0168370 | A1 | 6/2014 | Heidemann et al. |
| 2014/0267623 | A1 | 9/2014 | Bridges et al. |
| 2014/0268108 | A1 | 9/2014 | Grau |
| 2015/0015701 | A1 * | 1/2015 | Yu ............ H04N 5/2259 348/136 |
| 2015/0097931 | A1 | 4/2015 | Hatzilias et al. |
| 2015/0229907 | A1 | 8/2015 | Bridges |
| 2015/0253137 | A1 | 9/2015 | Jensen et al. |
| 2015/0373321 | A1 | 12/2015 | Bridges |
| 2016/0069670 | A1 | 3/2016 | Ruhland et al. |
| 2016/0073085 | A1 | 3/2016 | Hillebrand et al. |
| 2016/0073091 | A1 | 3/2016 | Hillebrand et al. |
| 2016/0073104 | A1 | 3/2016 | Hillebrand et al. |
| 2016/0129594 | A1 | 5/2016 | Telling |
| 2017/0188015 | A1 | 6/2017 | Heidemann et al. |
| 2017/0292828 | A1 | 10/2017 | Hillebrand et al. |
| 2018/0063510 | A1 | 5/2018 | Becker |
| 2018/0336690 | A1 | 11/2018 | Becker |
| 2019/0033064 | A1 | 1/2019 | Becker |

FOREIGN PATENT DOCUMENTS

| | | | |
|---|---|---|---|
| DE | 2950138 | A1 | 6/1981 |
| DE | 19502459 | A1 | 8/1996 |
| DE | 19536297 | A1 | 4/1997 |
| DE | 19637682 | A1 | 3/1998 |
| DE | 10149750 | A1 | 9/2002 |
| DE | 10219054 | A1 | 11/2003 |
| DE | 10313223 | A1 | 10/2004 |
| DE | 102007022361 | A1 | 11/2008 |
| DE | 102007032471 | A1 | 1/2009 |
| DE | 102007030378 | A1 | 2/2009 |
| DE | 102007059478 | B4 | 6/2009 |
| DE | 102009050604 | A1 | 6/2010 |
| DE | 202012104890 | U1 | 3/2013 |
| DE | 102012112322 | A1 | 6/2014 |
| EP | 1882895 | A1 | 1/2008 |
| EP | 2071510 | A3 | 6/2009 |
| EP | 2428764 | | 3/2012 |
| EP | 2620914 | A2 | 7/2013 |
| EP | 2693300 | A2 | 2/2014 |
| EP | 2728306 | A1 | 5/2014 |
| WO | 2005103863 | | 11/2005 |
| WO | 2009003225 | A1 | 1/2009 |
| WO | 2010015086 | A1 | 2/2010 |
| WO | 2012168322 | A2 | 12/2012 |
| WO | 2013184340 | A1 | 12/2013 |
| WO | 2013186160 | A1 | 12/2013 |
| WO | 2015006431 | A1 | 1/2015 |

OTHER PUBLICATIONS

CAD part inspection comparison software / 3D—Focus Inspection—Nikon Metrology, retreived Nov. 1, 2017 from Internet http://www.directindustry.com/prod/nikon-metrology/product-21023-608152.html, Copyright 2017, 18 pgs.

Creaform Metrology Solutions, "Handy Scan 3D—The Truly Portable Metrology-Grade 3D Scanners" brochure, Apr. 26, 2014; 7 pages.

Creaform, "Creaform Releases Completely Re-Engineered Handyscan 3D Portable Scanners", May 5, 2014, 1 page.

Hebert, P., "A Self-Referenced Hand-Held Range Sensor" Proceedings Third International Conference on 3-D Digital Imaging and Modeling, Quebec City, Que., 2001, pp. 5-12.

Mahdy, Yousef B., et al; "Projector Calibration Using Passive Stereo and Triangulation"; International Journal of Future Computer and Communication; vol. 2; No. 5; 385-390; Oct. 2013; 6 pgs.

Partial European Search Report issued in European Patent Application 19183806.9, dated Dec. 10, 2019.

\* cited by examiner

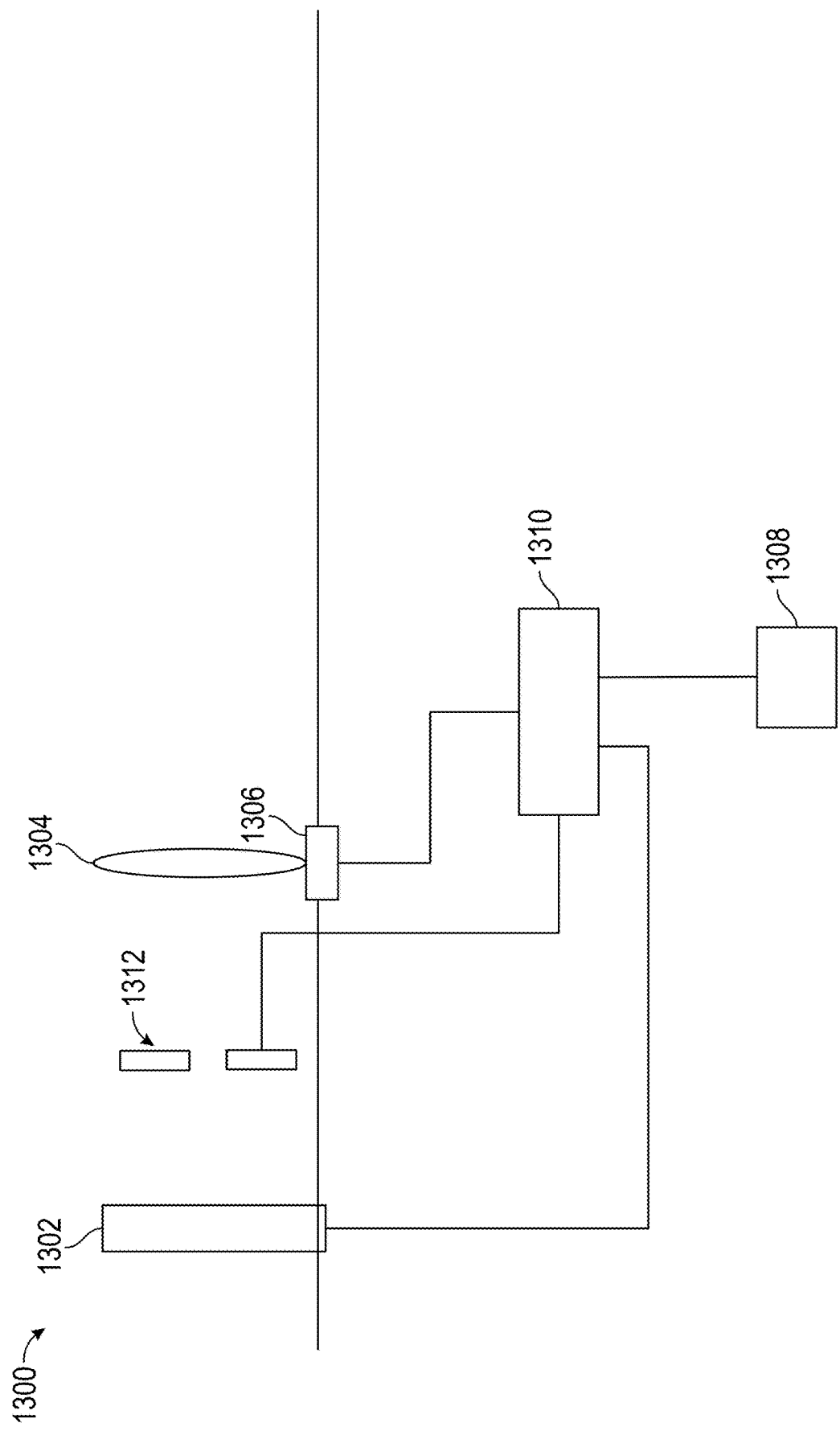

HANDHELD THREE DIMENSIONAL SCANNER WITH AN AUTOAPERTURE

CROSS REFERENCE TO RELATED APPLICATIONS

The present application is a divisional application of U.S. patent application Ser. No. 16/445,401 filed Jun. 19, 2019, which is a nonprovisional application which claims the benefit of U.S. Provisional Application Ser. No. 62/693,628, filed Jul. 3, 2018, the entire disclosure of which is incorporated herein by reference.

BACKGROUND

The subject matter disclosed herein relates to a portable scanner, and in particular to a portable scanner having one or more automatically adjustable foci or one or more automatically adjustable aperture.

A portable scanner includes a projector that projects light patterns on the surface of an object to be scanned. For one type of scanner, sometimes referred to as a structured light scanner, the position of the scanner relative to the surface is determined by means of a projected pattern. The scanner includes two (or more) cameras, the relative positions and alignment of which are known or can be determined, can record images of the surface. The three-dimensional coordinates (of the points of the pattern) can be determined from the recorded images by means of mathematical methods which are known per se, such as epipolar geometry. The two or more cameras are able to capture images of objects at a given distance from the scanner. However, situations arise in which the scanner is not able to be placed at the given distance.

Accordingly, while existing 3D scanners are suitable for their intended purpose the need for improvement remains, particularly in providing a 3D scanner that can acquire coordinates under a variety of operating conditions.

BRIEF DESCRIPTION

According to another aspect of the invention a method for a method of scanning an object with a three-dimensional (3D) scanner is provided. The method includes measuring a level of light intensity at a first camera of the 3D scanner, and automatically adjusting an aperture of a first camera of the 3D scanner to a first aperture size based on the measured level of light intensity.

According to another aspect of the invention, another three-dimensional (3D) scanning apparatus is provided. The apparatus includes a light intensity meter, a camera having an adjustable aperture and a processor. The light intensity meter measures a level of light intensity at the first camera of the 3D scanning apparatus. The processor is configured to adjust an aperture of the first camera automatically based on the measured light level.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 13 shows a camera system that includes an adjustable aperture in accordance with an embodiment.

Figure 1:
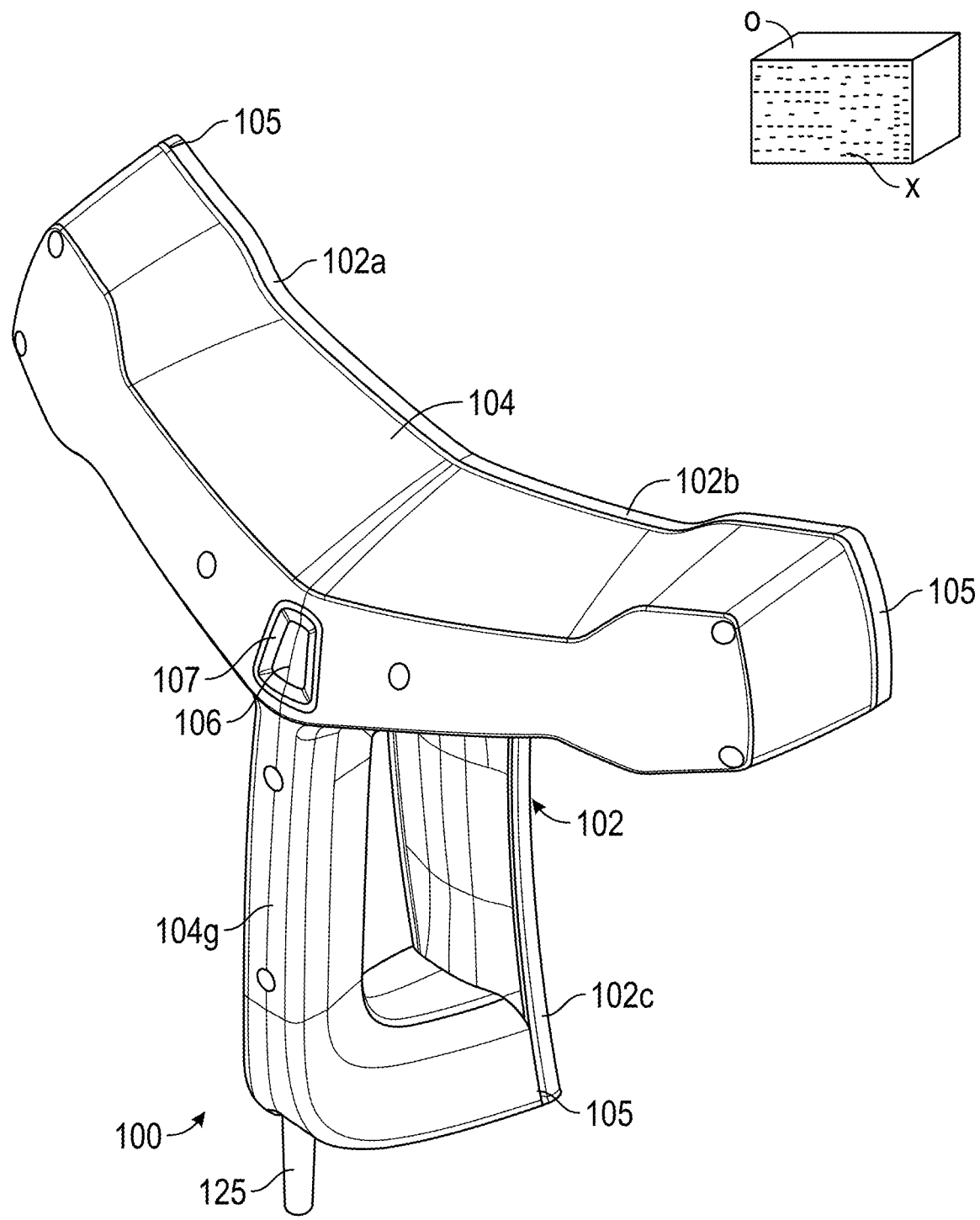
FIG. 1 shows a perspective view of a hand-held scanner and of an object in the environment.

The detailed description explains embodiments of the invention, together with advantages and features, by way of example with reference to the drawings.

DETAILED DESCRIPTION

Embodiments of the invention provide for a three-dimensional (3D) measurement device or 3D scanner that acquires 3D coordinate data of an object in an environment. Embodiments provide for a system including the capability of the 3D scanner to focus automatically, change one or more apertures automatically, or a combination thereof.

In one embodiment, the three-dimensional measurement device includes a carrying structure that is stable mechanically and thermally. The carrying structure defines relative distances and the relative alignments of one or more cameras and a projector. The arrangement of the one or more cameras and the projector are located on a front side of the 3D measuring device that faces the environment and/or an object in the environment. The carrying structure includes number of arms which protrude from a common center located at the intersection of the arms. Projectors and cameras can be placed at selected areas at the ends of the assigned arms. Their respective optics are directed through an assigned aperture in the carrying structure. A housing covers the reverse side and forms the handle part.

A "projector" is defined to generally refer to a device for producing a pattern of light. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

In one embodiment, the projected pattern has a wavelength in the infrared range. Cameras of the 3D scanner are configured to acquire images from light within this wavelength range, while also filtering out scattered light and other interferences in the visible wavelength range. A color or 2D camera can be provided as a third camera for additional information, such as color or texture for example. Such camera records images of the environment and of the object being scanned. In an embodiment where the camera captures color, a point cloud generated from the scanning process (herein referred to as the "3D-scan") can have color values assigned from the color information contained in the color images.

During operation, the 3D measuring device generates multiple 3D scans of the same scene, from different positions. The 3D scans are registered in a joint coordinate system. For joining two overlapping 3D scans, there are advantages in being able to recognizable structures within the 3D scans. Preferably, such recognizable structures are looked for and displayed continuously or, at least after the recording process. If, in a determined area, density is not at a desired level, further 3D scans of this area can be generated. A subdivision of the display used for representing a video image and the (thereto adjacent parts of the) three-dimensional point cloud helps to recognize in which areas a scan should still be generated.

In one embodiment, the 3D measuring device is designed as a portable scanner, i.e. it works at high speed and is of a size and weight suitable for carrying and use by a single person. It is, however, also possible to mount the 3D measuring device on a tripod (or on another stand), on a manually movable trolley (or another cart), or on an autonomously moving robot, i.e. that it is not carried by the user—optionally also by using another housing, for example without a carrying handle. It should be appreciated that while embodiments herein describe the 3D measuring device as being hand-held, this is for exemplary purposes and the claimed invention should not be so limited. In other embodiments, the 3D measuring device may also be configured as a compact unit, which is stationary or mobile and, if appropriate, built together with other devices.

Figure 2:
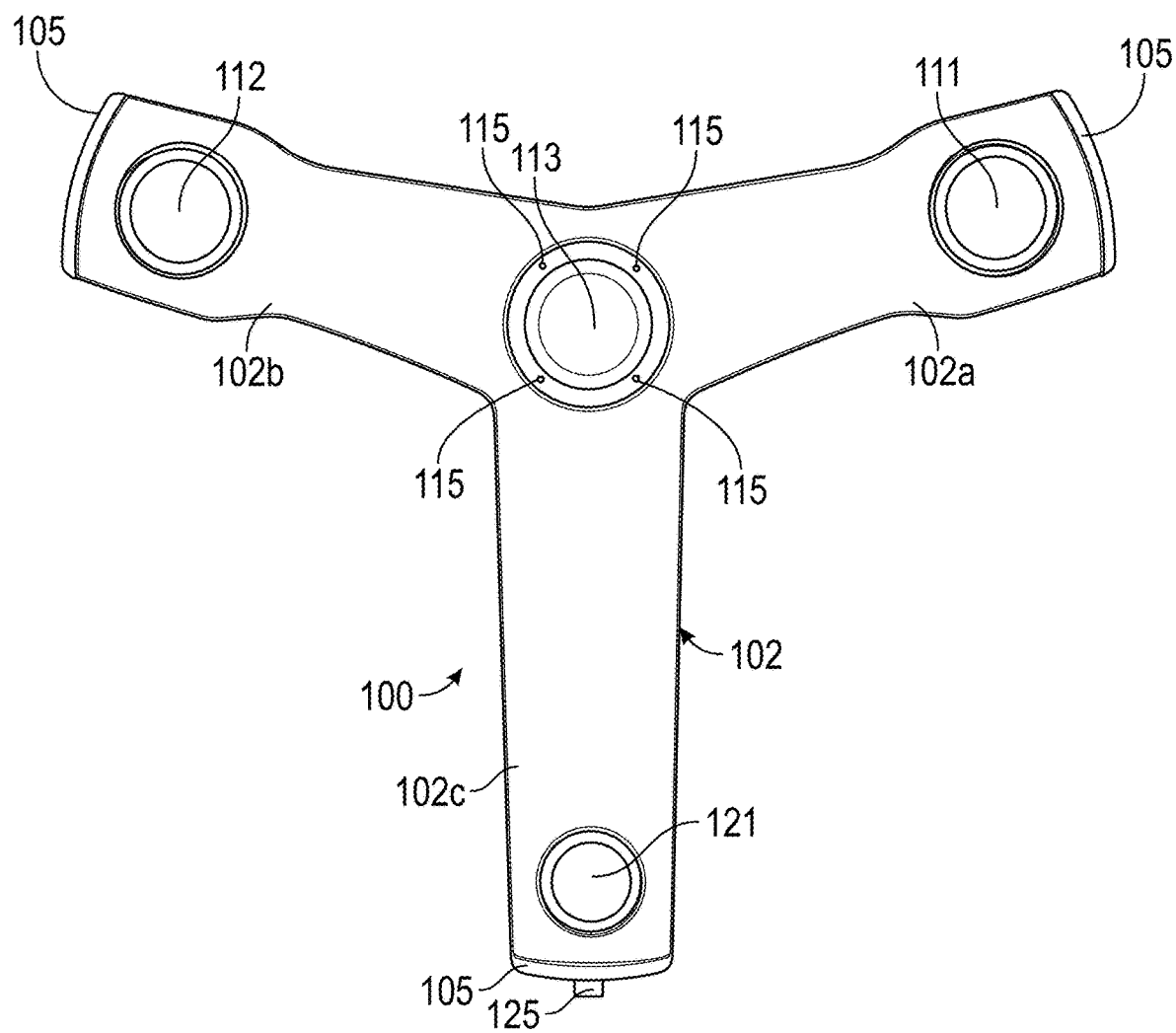
FIG. 2 shows a view of the front side of the hand-held scanner.

FIGS. 1 and 2 show a 3D measuring device 100 that is a portable part of a device for optically scanning and measuring an environment of the 3D measuring device 100 with an object O. FIG. 1 shows a perspective view of a reverse side of the measuring device 100, or a side which faces the user. FIG. 2 shows a front side of the measuring device 100 or a side of the measuring device 100 that faces the environment.

Referring to FIG. 2, the 3D measuring device 100 is provided on its front side with a carrying structure 102 having three arms 102a, 102b, 102c. Arms 102a, 102b and 102c give the carrying structure 102a T-shape or a Y-shape, i.e. a triangular arrangement. The area in which the three arms 102a, 102b, 102c intersect and are connected with each other defines a center of the 3D measuring device 100. From the user's view (FIG. 1), the carrying structure 102 is provided with a left arm 102a, a right arm 102b and a lower arm 102c. In one embodiment, the angle between the left arm 102a and the right arm 102b is, for example, approximately 150°+/−20°, between the left arm 102a and the lower arm 102c approximately 105°+/−10°. The lower arm 102c is, in some embodiments, somewhat longer than the two other arms 102a, 102b.

Referring still to FIG. 2, the carrying structure 102 may be configured from fiber-reinforced synthetic material, such as a carbon-fiber-reinforced synthetic material (CFC). In another embodiment, the carrying structure 102 is made from carbon-fiber-reinforced ceramics or from glass-fiber-reinforced synthetic material. The material renders the carrying structure 102 mechanically and thermally stable and provides at the same time for a low weight. The thickness of the carrying structure 102 is considerably smaller (for example 5 to 15 mm) than the length of the arms 102a, 102b, 102c (for example 15 to 25 cm). The carrying structure 102 hence has a flat basic shape. In some embodiments, the arms 102a, 102b, 102c, may include a reinforced back near the center of the arm. It is, however, preferably not configured to be planar, but to be curved. Such curvature of the carrying structure 102 is adapted to the curvature of a sphere having a radius of approximately 1 to 3 m. The front side (facing the object O) of the carrying structure 102 is thereby configured to be concave, the reverse side to be convex. The curved shape of the carrying structure 102 is advantageous for providing stability. The front side of the carrying structure 102 (and in one embodiment the visible areas of the reverse side) is configured to be a viewing area, i.e. it is not provided with hiders, covers, cladding or other kinds of packaging. The preferred configuration from fiber-reinforced synthetic materials or ceramics is particularly suitable for this purpose.

Referring now to FIG. 1, on the reverse side of the carrying structure 102, a housing 104 is arranged, which is connected with the carrying structure 102 by means of appropriate connecting means, for example by means of rubber rings and screws with a bit of clearance. The connection between the housing 104 and the carrying structure 102 is a floating connection, which refers to a connection that reduces or eliminates the transmission of vibration from the housing 104 to the carrying structure 102. In one embodiment, the floating connection is formed by a rubber isolation mount disposed between the housing 104 and the carrying structure 102. In one embodiment, an elastomeric seal, such as rubber, is disposed between the outer perimeter of the carrying structure 102 and the housing 104. The carrying structure 102 and the housing 104 are then clamped together using elastomeric bushings. The seal and bushings cooperate to form the floating connection between the carrying structure 102 and the housing 104. Within the area of the left arm 102a and of the right arm 102b, the edge of the housing 104 extends into the immediate vicinity of the carrying structure 102, while the housing 104 extends from the center of the 3D measuring device 100 within the area of the lower arm 102c, at a distance to the carrying structure 102, forming a handle part 104g, bends off at the end of the handle part 104g and approaches the end of the lower arm 102c, where the handle part 104g is connected with the lower arm 102c in a floating manner. The housing 104 acts as a hood to cover the reverse side of the carrying structure 102 and define an interior space.

Protective elements 105 may be attached to the housing 104 or to the carrying structure 102. In one embodiment, protective elements 105 are arranged at the ends of and extend outward from the arms 102a, 102b, 102c to protect the 3D measuring device 100 from impacts and from damage resulting thereof. When not in use, the 3D measuring device 100 can be put down safely on a flat surface with its front side facing down. Due to the concave curvature of the front side, on the 3D measuring device 100 will only contact the surface at the ends of the arms 102a, 102b, 102c. In embodiments in which the protective elements 105 are positioned at the ends of the arms 102a, 102b, 102c the protective elements 105 will provide additional clearance with the surface.

A control actuator or control knob 106 is arranged on the housing 104 on the reverse side of the 3D measuring device 100. The control knob 106 can be used for stopping or starting the scanning process, i.e., the optical scanning and measuring. The control knob 106 is arranged in the center of the housing 104 adjacent one end of the handle. The control knob 106 may be multi-functional and provide different functions based on a sequence of actions by the user. These actions may be time based (e.g. multiple button pushed within a predetermined time), or space based (e.g. the button moved in a predetermined set of directions), or a combination of both. In one embodiment, the control knob 106 may be tilted in several directions in (e.g. left, right, up, down). In one embodiment, there are one or more status lamps 107 located around the control knob 106. These status lamps 107 may be used to show the actual status of the 3D measuring device 100 and thus facilitate the operation thereof. The status lamps 107 can preferably show different colors (for example green or red) in order to distinguish between statuses of the 3D measuring device 100. The status lamps 107 may be a light emitting diode (LED).

Referring again to FIG. 2, a first camera 111 is arranged on the left arm 102a (in the area of its end) of the carrying structure 102, and a second camera 112 is arranged on the right arm 102b (in the area of its end) of the carrying structure 102. The first camera 111 and the second camera 112 are spaced apart from each other at a defined distance. The two cameras 111 and 112 are arranged on the reverse side of the carrying structure 102 and fixed thereto, wherein the carrying structure 102 is provided with apertures through which the respective camera 111, 112 can acquire images through the front side of the carrying structure 102. The two cameras 111, 112 are preferably surrounded by the connecting means for the floating connection of the housing 104 with the carrying structure 102.

Each of the cameras 111, 112 have a field of view associated therewith. The alignments of the first camera 111 and of the second camera 112 to each other are adjusted or adjustable in such a way that the fields of view overlap to allow stereoscopic images of the object O (FIG. 1). If the alignments are fixed, there is a desired predetermined overlapping range, depending on the application for which the 3D measuring device 100 is used. In various embodiments, an overlapping range of several decimeters or meters is desired. In another embodiment, the alignments of the cameras 111, 112 can be adjusted by the user, for example by pivoting the cameras 111, 112 in opposite directions. In one embodiment, the alignment of the cameras 111, 112 is tracked and therefore known to the 3D measuring device 100. In another embodiment, the alignment is initially random (and unknown), and is then determined, for example by measuring the positions of the cameras. In still another embodiment, the alignment is set and fixed during manufacture or calibration of the 3D measuring device 100. In embodiments where the first and second cameras 111, 112 are adjustable, a calibration may be performed in the field in order to determine the angles and positions of the cameras in the 3D measuring device 100. The types of calibrations that may be used are discussed further herein.

In an embodiment, the first camera 111 and the second camera 112 are monochrome, i.e. sensitive to a narrow wavelength range, for example by being provided with corresponding filters, which then filter out other wavelength ranges, including scattered light. This narrow wavelength range may also be within the infrared range. In order to obtain color information on the objects O, the 3D measuring device 100 preferably includes a 2D camera (e.g. a camera that acquires an image lacking depth information), such as color camera 113 which may be aligned symmetrically to the first camera 111 and to the second camera 112, and arranged in the center of the 3D measuring device 100, between the cameras 111, 112. The 2D camera 113 may include an image sensor that is sensitive to light in the visible wavelength range. The 2D camera 113 captures 2D images of the scene, i.e. the environment of the 3D measuring device 100, including the objects O therein included.

Figure 3:
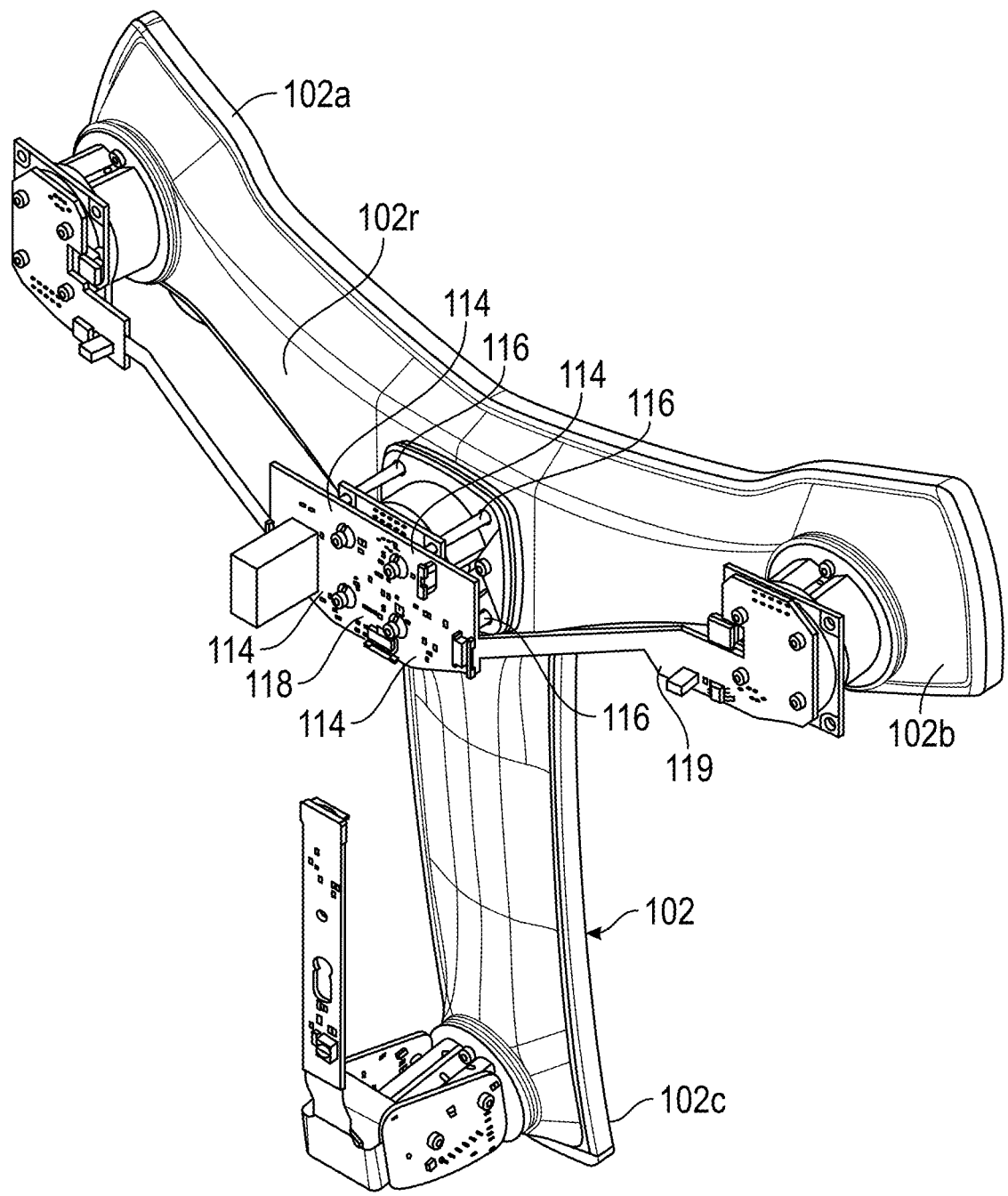
FIG. 3 shows a perspective view corresponding to FIG. 1 without a housing.

FIG. 3 shows a perspective view of FIG. 1 with the housing 104 removed. FIG. 3 shows a light source that is used to illuminate the scene for the 2D camera in the event of unfavorable lighting conditions. In one embodiment, the light source includes various light sources, such as four light-emitting diodes (LED) 114 shown in FIG. 3. A radiating element 115 (See FIG. 2) is associated with each of the LEDs 114. The light emitted from the light-emitting diode 114 is deflected in correspondence with the alignment of the 3D measuring device 100, from the corresponding LED 114. The radiating element 115 (FIG. 2) can be a lens or an appropriately configured end of a light guide. Four radiating elements 115 (FIG. 2) are shown arranged equally spaced around the color camera 113. Each LED 114 is connected with its associated radiating element 115 (FIG. 2) by means of a light guide. The LED 114 therefore can be structurally arranged at a control unit 118 of the 3D measuring device 100, such as by being fixed on a board thereof. In some embodiments, sections of the carrying structure 102 may include a reinforced back 102r. The reinforced back 102r protrudes into the interior of the housing 104.

Referring still to FIG. 3, in order to have a reference for the images recorded by the cameras 111, 112, 113, a sensor such as an inclinometer 119 may be provided. The sensor can also be an inertial measurement unit that obtains linear acceleration and rotation measurements, in various embodiments. In one embodiment, the inclinometer 119 is an acceleration sensor (with one or several sensitive axes), which is manufactured in a manner known per se, as MEMS (micro-electro-mechanical system). Other embodiments and combinations of the inclinometer 119 are possible in other embodiments. The inclinometer 119 associates a gravitational direction with the data obtained by the 3D measuring device 100.

During operation of the 3D measuring device 100, images are recorded by the first camera 111 and by the second camera 112. From these images three-dimensional data can be determined, i.e. 3D-scans of the object O can be produced, for example by means of photogrammetry. The object O, however, may have few structures or features and many smooth surfaces. As a result, the generation of 3D-scans from the scattered light of the objects O is difficult.

To resolve this difficulty, a projector 121 may be used, which is arranged at the lower arm 102c (in the area of its end). FIG. 3 shows the projector 121 arranged within the interior space on the reverse side of the carrying structure 102 and fixed thereto. The carrying structure 102 is provided with an aperture through which the projector 121 can project a pattern of light through the front side of the carrying structure 102. In one embodiment, the projector 121 is surrounded by the connecting means to provide a floating connection between the housing 104 with the carrying structure 102. The projector 121, the first camera 111, and the second camera 112 are arranged in a triangular arrangement with respect to each other and aligned to the environment of the 3D measuring device 100. The projector 121 is aligned in correspondence with the two cameras 111, 112. The relative alignment between the cameras 111, 112 and the projector 121 is preset or can be set by the user.

In one embodiment, the cameras 111, 112 and the projector 121 form an equilateral triangle and have a common tilt angle. When arranged in this manner, and if the field of view of the cameras 111, 112 and the projector 121 are similar, the centers of the field of view will intersect at a common point at a particular distance from the measuring device 100. This arrangement allows for a maximum amount of overlap to be obtained. In embodiments where the tilt or angle of the cameras 111, 112 and projector 121 may be adjustable, the distance or range to the intersection of the fields of view may be changed.

If the user places 3D measuring device 100 on a flat surface on its front side, i.e. with the front side to the surface, the concave curvature of the front side creates a gap between the cameras 111, 112, 113 and the projector 121 from the surface, so that the respective lenses are protected from damage.

Referring to FIGS. 1-3, the cameras 111, 112, 113, the projector 121, the control knob 106, the status lamps 107, the light-emitting diodes 114 and the inclinometer 119 are connected with and in communication with the common control unit 118, which is arranged inside the housing 104. This control unit 118 can be part of a control and evaluation device which is integrated in the housing. In an embodiment, the control unit 118 is connected with a standardized communication interface at the housing 104, the interface being configured for a wireless connection (for example Bluetooth, WLAN, DECT) as an emitting and receiving unit, or for a cable connection (for example USB, LAN), if appropriate also as a defined interface, such as that described in DE 10 2009 010 465 B3, the contents of which are incorporated by reference herein. The communication interface is connected with an external control and evaluation device 122 (FIG. 4) by means of said wireless connection or connection by cable.

Figure 4:
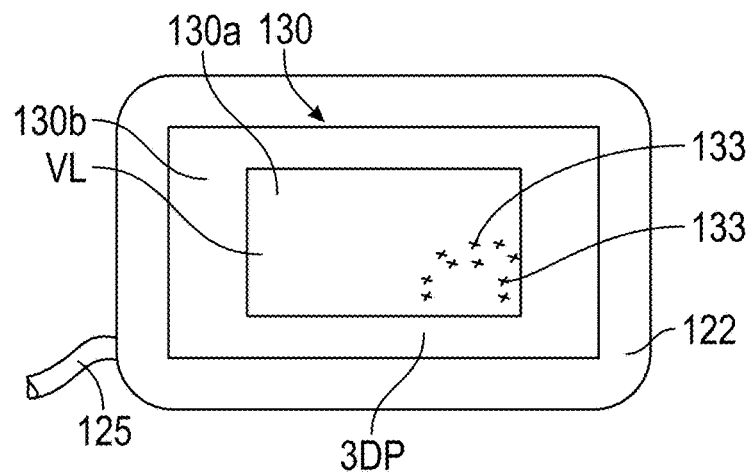
FIG. 4 shows a representation of a control and evaluation device of the scanner with a display.
Figure 5:
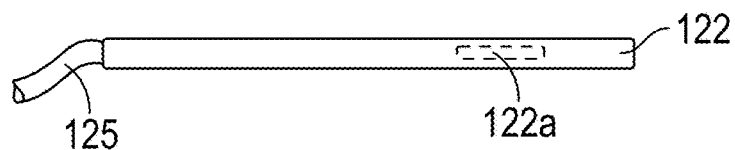
FIG. 5 shows a representation of the control and evaluation device of FIG. 4 from a side.

FIGS. 4 and 5 show a top and side view, respectively, of the external control and evaluation device 122. The external control and evaluation device 122 is configured for connection to the communication interface of the 3D measurement device via a cable 125 is plugged into the housing 104 (FIG. 1), for example at the lower end of the handle part 104g, so that the cable 125 extends in prolongation of the handle part 104g.

Referring to FIGS. 4 and 5, the control and evaluation device 122 may include one or more processors 122a having memory. The processors 122a being configured to carry out the methods for operating and controlling the 3D measuring device 100 and evaluating and storing the measured data. The control and evaluation device 122 may be a portable computer (notebook) or a tablet (or smartphone), or any external or distal computer (e.g. in the web). The control and evaluation device 122 may also be configured in software for controlling the 3D measuring device 100 and for evaluating the measured data. However, the control and evaluation device 122 may be embodied in separate hardware, or it can be integrated into the 3D measuring device 100. The control and evaluation device 122 may also be a system of distributed components, at least one component integrated into the 3D measuring device 100 and one component externally. Accordingly, the processor(s) 122a for performing said methods may be embedded in the 3D measuring device 100 and/or in an external computer.

Referring back to FIG. 1, the projector 121 projects a pattern X, which it produces, for example by means of a diffractive optical element, on the object O to be scanned. The pattern X may be a coded pattern (e.g. single-valued), or may be uncoded, for example periodically (i.e. multivalued). In an embodiment using an uncoded pattern, the multi-valuedness is resolved by the use of the two cameras 111, 112, combined with the available, knowledge of the shape and direction of the pattern. The uncoded pattern may, for example, be a projection of identical periodically spaced pattern elements (e.g. spots or lines of light). As used herein, the term "pattern element" refers to the shape of an element of the pattern X, while the term "point" indicates the position (of a pattern element or of something else) in 3D coordinates. The correspondence between the projected pattern elements from the projector 121 and the pattern elements in the images on the photosensitive arrays of the cameras 111, 112 is determined through simultaneous epipolar constraints and using calibration parameters, as discussed further herein. The uniqueness in the correspondence of the points is achieved by the use of the two cameras 111 and 112, combined with the knowledge of the shape and direction of the pattern, the combined knowledge being obtained from a calibration of the 3D measuring device 100.

Figure 6:
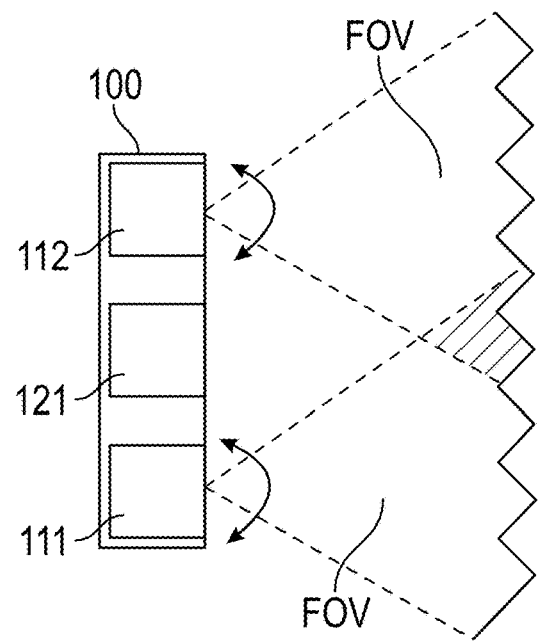
FIG. 6 shows the fields of view of the cameras with a shaded overlap region.
Figure 7:
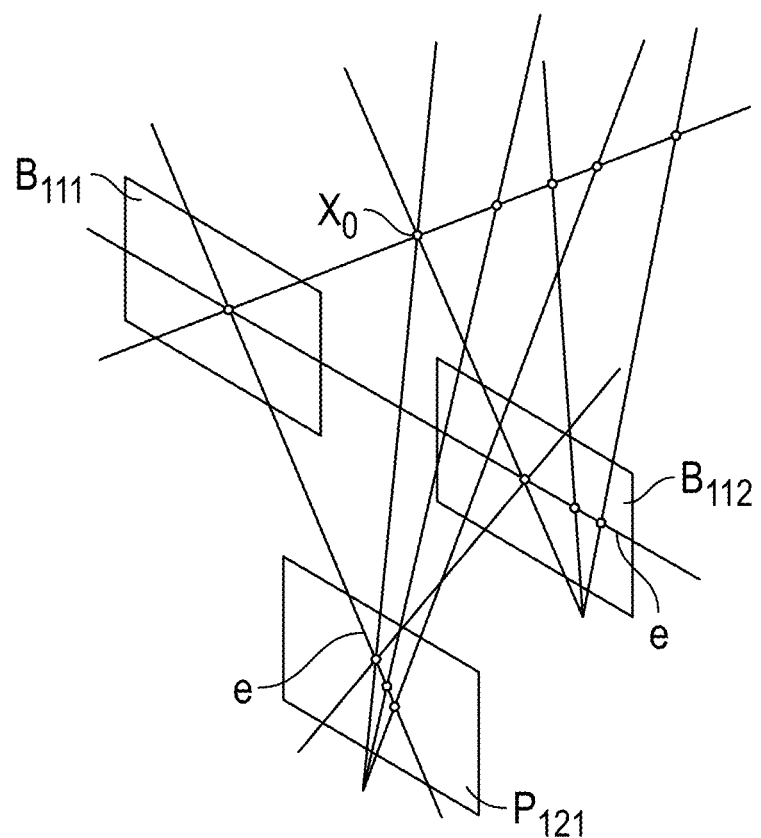
FIG. 7 shows the geometrical relationship of the image planes, projector plane, and epipolar lines.

In an embodiment, the uncoded pattern X (FIG. 1) may be a point pattern, comprising a regular arrangement of points in a grid. In embodiments of the present invention, for example, approximately one hundred times one hundred points (10,000 points total) are projected over a field of view FOV (see FIG. 6) at an angle of approximately 50° to a distance of approx. 0.5 m to 5 m. The pattern X can also be a line pattern or a combined pattern of points and lines, each of which is formed by tightly arranged light points. Referring to FIG. 7, the first camera 111 comprises a first image plane B111, and the second camera 112 comprises a second image plane B112. The two cameras 111 and 112 receive at least a portion of the pattern X in their respective image planes B111 and B112, in which the photosensitive arrays (for example CMOS or CCD arrays) are arranged to capture a portion of the pattern X reflected from the object O.

There is a relationship between the point density, the distance between the projector 121 and the object O and the resolution that can be obtained with the produced pattern X. With diffractive pattern generation, the light of one source is distributed over the pattern. In that case the brightness of the pattern elements depends on the number of elements in the pattern when the total power of the light source is limited. Depending on the intensity of the light scattered from the objects and the intensity of background light it may be determined whether it is desirable to have fewer but brighter pattern elements. Fewer pattern elements means the acquired point density decreases. It therefore seems helpful to be able to generate, in addition to pattern X, at least one other pattern. Depending on the generation of the patterns, a dynamic transition between the patterns and/or a spatial intermingling is possible, in order to use the desired pattern for the current situation. In an embodiment, the projector 121 may produce the two patterns offset to each other with respect to time or in another wavelength range or with different intensity. The other pattern may be a pattern which deviates from pattern X, such as an uncoded pattern. In the illustrated embodiment the pattern is a point pattern with a regular arrangement of points having another distance (grid length) to each other.

Figure 8:
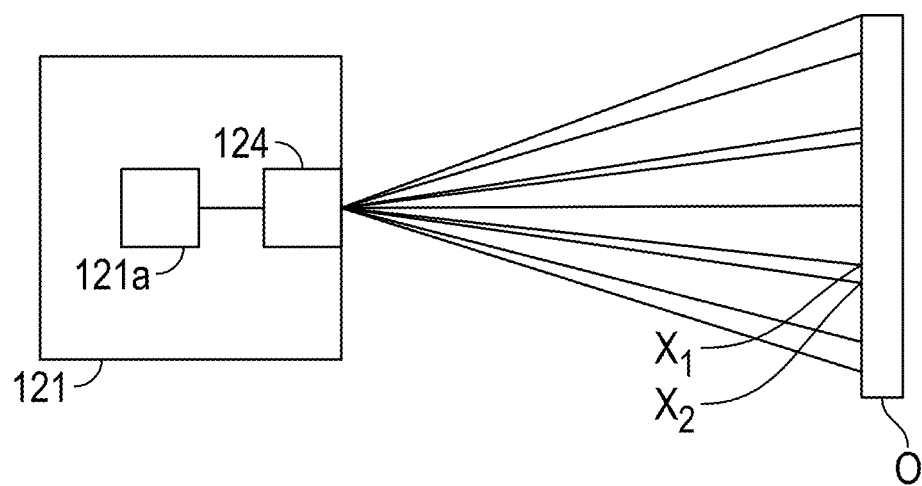
FIG. 8 shows a diffractive optical element for producing a pattern at an object.

In one embodiment, the pattern X is a monochromatic pattern. The pattern X may be produced by means of a diffractive optical element 124 in the projector 121. The diffractive optical element 124 converts a single beam of light from a light source 121a in FIG. 8 to a collection of collection of beams, each having lower optical power than the single beam. Each of the collection of beams traveling in a different direction to produce a spot when striking the object O. The light source 121a may be a laser, a superluminescent diode, or an LED, for example. In an embodiment, the wavelength of the light source 121a is in the infrared range. The lateral resolution is then limited only by the diameter and spacing of the spots of light in the projected pattern X. If the pattern X is in the infrared range, it is possible to capture the images of the object O and surrounding environment with the 2D camera 113 without interference from the pattern X. Similarly, if the pattern X is produced in the ultraviolet light wavelength range, the images acquired by the 2D camera 113 would not have interference from the pattern X.

In one embodiment, the projector 121 produces the pattern X on the objects O only during the time periods when the cameras 111, 112 (and if available 113) are recording images of the objects O. This provides advantages in energy efficiency and eye protection. The two cameras 111, 112 and the projector 121 are synchronized or coordinated with each other, with regard to both, time and the pattern X used. Each recording process starts by the projector 121 producing the pattern X, similar to a flash in photography, followed by the cameras 111, 112 (and, if available 113) acquiring pairs of images, in other words one image each from each of the two cameras 111, 112. As used herein, these pairs of images that are acquired at substantially the same time are referred to as "frames." The recording process can comprise one single frame (shot), or a sequence of a plurality of frames (video). Such a shot or such a video is triggered by means of the control knob 106. After processing of the data, each frame then constitutes a 3D-scan consisting of a point cloud in the three-dimensional space. This point cloud is defined in the relative local coordinate system of the 3D measuring device 100.

The data furnished by the 3D measuring device 100 are processed in the control and evaluation device 122 to generate the 3D scans from the frames. The 3D scans in turn are joined or registered in a joint coordinate system. For registering, the known methods can be used, such as by identifying natural or artificial targets (i.e. recognizable structures) in overlapping areas of two 3D scans. Through identification of these targets, the assignment of the two 3D scans may be determined by means of corresponding pairs. A whole scene (a plurality of 3D scans) is thus gradually registered by the 3D measuring device 100. The control and evaluation device 122 is provided with a display 130 (display device), which is integrated or connected externally.

In an exemplary embodiment, the projector 121 is not collinear with the two cameras 111 and 112, but rather the camera's 111, 112 and projector 121 are arranged to form a triangle. As shown in FIG. 7, this triangular configuration enables the use of epipolar geometry based on mathematic methods of optics. The constraints of epipolar geometry provide that a point on the projector plane $P_{121}$ of the projector 121 falls on a first epipolar line on the first image plane $B_{111}$ and on a second epipolar line of the second image plane $B_{112}$, the epipolar lines for each of the image planes $B_{111}$ and $B_{112}$ being determined by the relative geometry of the projector 121 and the two cameras 111 and 112. Further, a point on the first image plane $B_{111}$ falls on an epipolar line of the projector plane $P_{121}$ and on an epipolar line of the second image plane $B_{112}$, the epipolar lines in the projector plane and second image plane being determined by the relative geometry of the projector 121 and cameras 111, 112. Further still, a point on the second image plane $B_{112}$ falls on an epipolar line of the projector plane $P_{121}$ and on an epipolar line of the first image plane $B_{111}$, the epipolar lines in the projector plane and the first image plane being determined by the relative geometry of the projector 121 and cameras 111, 112. It can be seen that the use of at least two cameras and one projector provides sufficient epipolar constraints to enable a correspondence among points in the pattern X to be determined for the points on the image planes $B_{111}$ and $B_{112}$ and the projector plane $P_{121}$, even though the projected pattern elements have no distinguishing characteristics, such as having an identical shape for example (an uncoded pattern).

In one embodiment, at least three units (e.g. projector 121 and the two cameras 111, 112) are used to generate the 3D scenes. This allows for unambiguous triangular relations of points and epipolar lines from which the correspondence of projections of the pattern (X) in the two image planes $B_{111}$, $B_{112}$ can be determined. Due to the additional stereo geometry relative to a pair of cameras, considerably more of the points of the pattern, which otherwise cannot be distinguished, can be identified on an epipolar line "e." The density of features on the object O can thus simultaneously be high, and the size of the pattern X feature (e.g. the spot) can be kept very low. This contrasts with other methods that utilize encoded patterns where the size of the feature in the pattern has a lower limit based on the resolution of the projector, this size limitation in coded patterns limits the lateral resolution of the 3D scan. Once the correspondence among the points X on the projector 121 and cameras 111, 112 has been determined, the three-dimensional coordinates of the points on the surface of the object O may be determined for the 3D-scan data by means of triangulation.

Triangulation calculations may be performed between the two cameras 111, 112 based on the baseline distance between the two cameras 111, 112 and the relative angles of tilt of the two cameras 111, 112. Triangulation calculations may also be performed between the projector 121 and first camera 111 and between the projector 121 and the second camera 112. To perform these triangulation calculations, a baseline distance is needs to be determined between the projector 121 and the first camera 111 and another baseline distance is needs to be determined between the projector 121 and the second camera 112. In addition, the relative angles of tilt between the projector/first camera and projector/second camera is used.

In principle, any one of the three triangulation calculations is sufficient to determine 3D coordinates of the points X on the object O, and so the extra two triangulation relations provides redundant information (redundancies) that may be usefully employed to provide self-checking of measurement results and to provide self-calibration functionality as described further herein below. As used herein, the term "redundancy" refers to multiple determinations of 3D coordinates for a particular point or set of points on the object.

Additional three-dimensional data can be gained by means of photogrammetry methods by using several frames with different camera positions, for example from the 2D camera 113 or from a part of an image acquired by the cameras 111, 112. To perform photogrammetry calculations the objects viewed by the cameras 111, 112, 113 should be illuminated. Such illumination may be background illumination, such as from the sun or artificial lights for example. The background illumination may be provided by the 3D measuring device 100 or by another external light source. In an embodiment, the object is illuminated with light from LEDs 114. Illumination enables the two-dimensional cameras 111, 112, 113 to discern properties of the object such as color, contrast, and shadow, which facilitate identification of object features.

The measuring process may also have a temporal aspect. Typically, uncoded patterns were used with stationary devices to allow an entire sequence of patterns to be projected and images be captured in order to determine a single 3D-scan. In order for this 3D scan to be determined, both the scanner and the object needed to remain stationary relative to each other. In contrast, embodiments of the present invention generate one 3D-scan for each set of images acquired by the cameras 111, 112. In another embodiment (not shown), a second projector is arranged adjacent to the present projector 121 or a further diffractive optical element is provided. This second projector emits at least one second pattern on to the object O in addition to pattern X. In an embodiment having two projectors, it is possible to switch between the pattern X and the second pattern to capture with one set of images with the different patterns consecutively. Thus, the 3D-scan has a higher resolution by combining the evaluation results obtained from the different patterns.

The data furnished by the 3D measuring device 100 is processed in the control and evaluation device 122 by generating 3D scans from the image frames. The 3D scans in turn are then joined or registered in a common coordinate system. As discussed above, registration methods know in the art may be used, such as by using natural or artificial targets (i.e. recognizable structures) for example. These targets can be localized and identified in order to determine the assignment or alignment of two different 3D scans relative to each other by means of corresponding pairs. The 3D scans (sometimes colloquially referred to as a "scene") may then be gradually registered by the 3D measuring device 100. In the exemplary embodiment, the control and evaluation device 122 is provided with a display 130 (display device) to allow the user to review the 3D scans.

In one aspect, the cameras of the measuring device 100 includes adjustable lenses or adjustable lens systems that allow the camera to capture images of objects at varying distances. It should be appreciated that while the illustrated embodiment of FIGS. 1-8 described a structured light scanner that projected an uncoded light pattern, this is for exemplary purposes and the claims should not be so limited. In other embodiments, the adjustable lenses or adjustable lens systems may be incorporated into any optical scanning system that determines distance based on triangulation principals. As such, the 3D scanner may be a structured light scanner that projects a coded pattern, an image scanner, a photogrammetry scanner, or a laser line probe for example.

Figure 9:
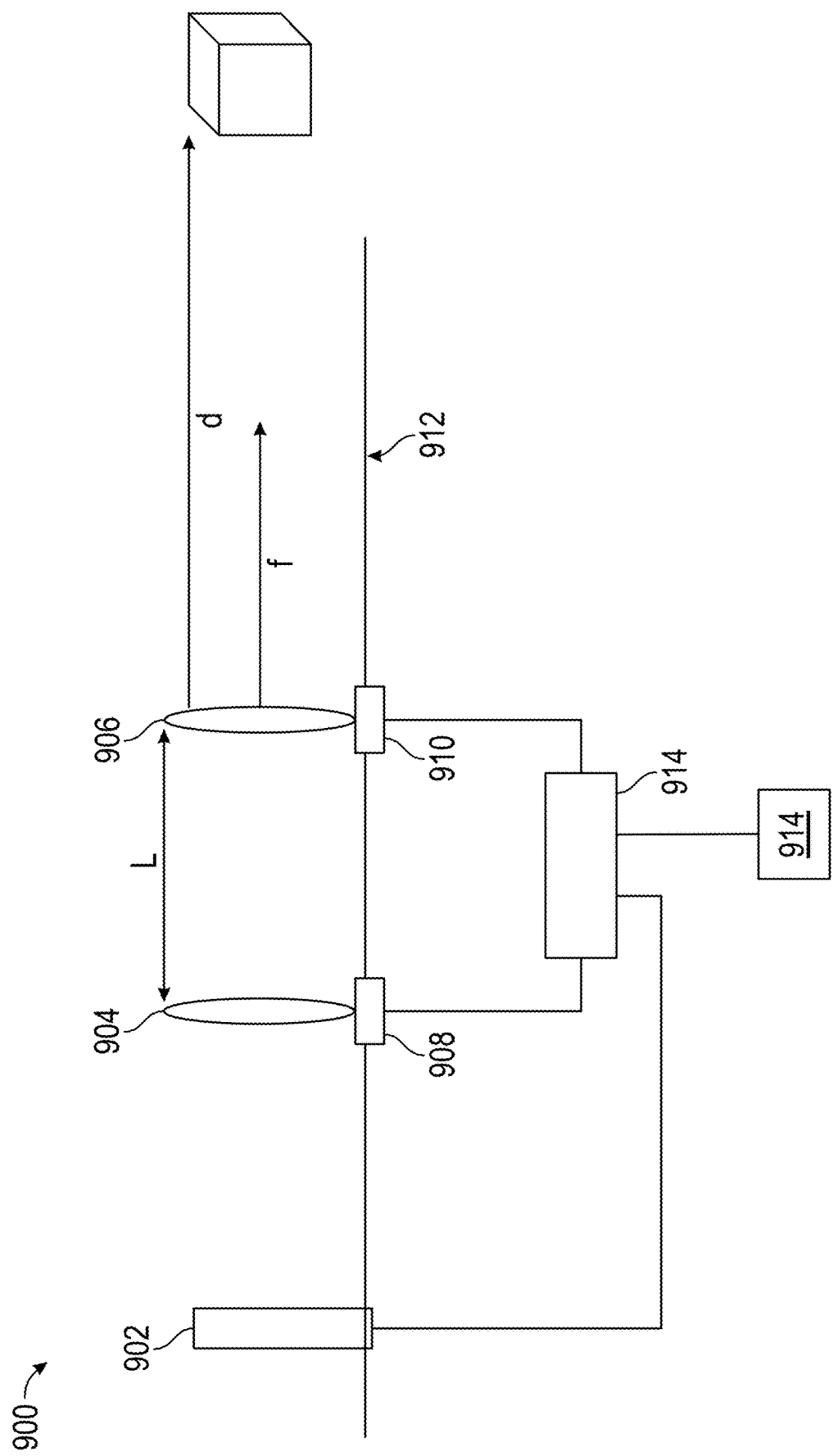
FIG. 9 shows an adjustable lens system for a camera of the scanner of FIG. 1.

FIG. 9 shows an adjustable lens system 900 for a camera of the measuring device 100 in one embodiment of the invention. The camera can be one or more of the monochromatic cameras 111, 112 and color camera 113 of the measuring device 100, in various embodiments. The adjustable lens system 900 includes an image plane or photosensitive array 902 at which an imaging device, such as a photosensitive array 902. One or more lens are placed in front of the photosensitive array 902 and define an optical axis for the photosensitive array 902. The first lens 904 and the second lens 906 are shown separated by distance L along a track 912. While the first lens 904 and the second lens 906 are shown as convex lenses, they can be any suitable combination of convex and concave lens, in various embodiments. The first lens 904 is coupled to a first linear actuator 908 that moves the first lens 904 along the track 912. The second lens 906 is coupled to a second linear actuator 910 that moves the second lens 906 along the track 912. A processor 914 controls operation of the first linear actuator 908 and the second linear actuator 910 in order to change the locations of the first lens 904 and the second lens 906 along the track 912. Relative motion of the first lens 904 and second lens 906 changes a focal length of the lens system 900. A focus distance of a lens system is a function of focal length, a position of the lens system and/or a position of a lens within the lens system. Therefore, the focus distance can be changed by changing either the focal length of the lens system, the position of the lens system, a position of a lens within the lens system, or a combination of the focal length, the position of the lens system, and the position of the lens within the lens system.

In one embodiment, the processor 914 adjusts the locations of the first lens 904 and second lens 906 in order to obtain a selected focal length f for the lens system 900. The first lens 904 and the second lens 906 can be moved with respect to each other. Also, the first lens 904 and second lens 906 can be moved as a unit with respect to the photosensitive array 902. In various embodiments, the adjustable lens system 900 can include a single lens, and the single lens is moved with respect to the photosensitive array 902. In one embodiment, the processor 914 adjusts the focal length fin order to achieve a focus distance for the lens system 900 that produces a clear image of the object 920 at the photosensitive array 902. In one embodiment, the processor 914 receives a distance d to the object (i.e., a distance between the camera and the object) from a distance measurement device 916. In one embodiment, the distance measurement device 916 can include a time-of-flight measurement device that measures a time between projection of a pulse of light and reception of the reflection of the pulse of light from the object 920. The distance measurement itself can be used to optimize a sharpness and/or focus positon one or more of the lenses of the adjustable lens system 900. The distance measurement can be used iteratively to optimize these positions. Using the determined time-of-flight, the processor 914 determines the distance to the object and adjusts the locations of the lenses 904, 906 to a focal length that provides a clear image of the object at distance d.

In another embodiment, the processor 914 receives an image of the object captured at the photosensitive array 902. The processor 914 runs a method for analyzing a sharpness of the image and determining an adjustment to the lens system that increases the sharpness of the image. The processor then operates the first and second actuators 908, 910 in order to adjust the locations of the first and second lenses 904, 906 in order to increase sharpness of the image, thereby changing the focal length of the lens system 900. Alternatively, the processor can shift the first and second lenses together to change the location of the focal point (i.e., the focus distance) without changing the focal length of the lens system.

In one embodiment, the method of analyzing the sharpness of the image include contrast detection. In contrast detection, autofocus is achieved by measuring intensity difference between adjacent pixels of the photosensitive array 902 for different focal position. The intensity difference increases as the image focus increases. Therefore, the position of maximum contrast is selected. The position of the lens is changed in a particular direction as long as moving in the particular direction increases contrast. If moving the lens in the particular direction lowers the contrast, the direction for moving the lens is changed. This process is continued until the lens of position of maximum contrast is located.

In another embodiment, the method of analyzing the sharpness of the image include phase detection. In phase detection, incoming light from separate locations (edge-rays) of a lens are separated to form sub-images. The light intensity of the sub-images are compared with each other in order to determination a position and deviation that the sub-images have to each other. A correction is calculated, which is sent to an actuator of the lens system, and the distance setting is corrected so that the subject is in focus.

Although not shown in FIG. 9, a second object can be placed at a second location along the optical axis of the lens system 900, and the processor 914 can perform the same methods for determining object distance and for adjusting the focus distance of the lens system 900 in order to capture an image of the second object. Thus, the 3D measuring device 100 scan objects at varying distances.

Figure 10:
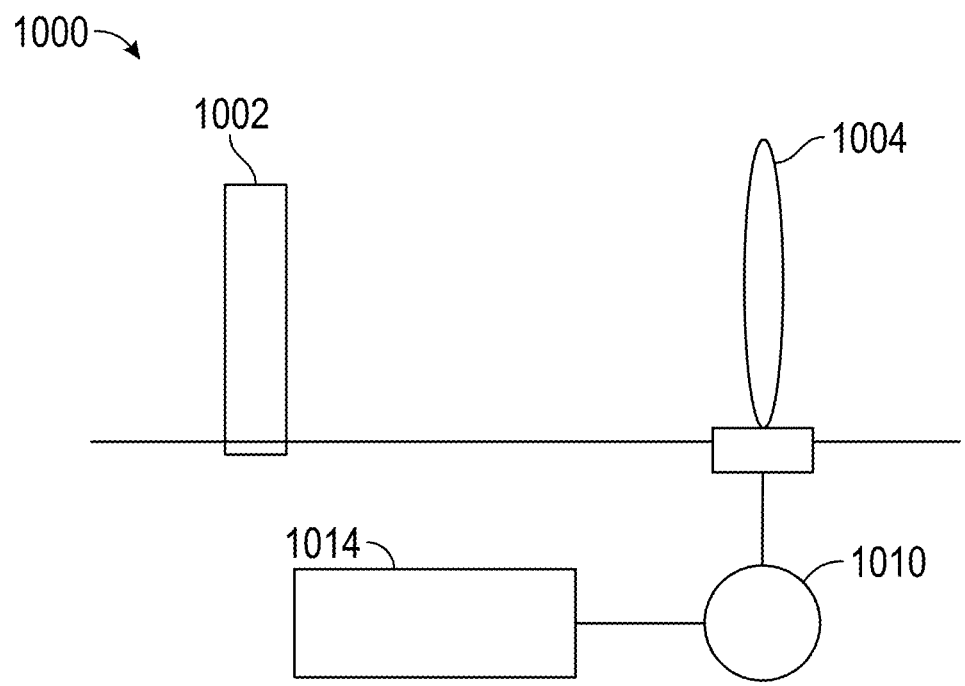
FIG. 10 shows a system for adjusting a focal length of a lens system in accordance with another embodiment.

FIG. 10 shows another embodiment of a method for adjusting a focus distance of a lens system 1000. The lens system 1000 is shown having only a single lens 1004 for illustrative purposes. However, it is to be understood that lens system 1000 can have any number of lenses, in alternate embodiments. The lens system 1000 includes lens 1004 that is mechanically distortable. The degree of distortion is a function of the amount of voltage applied across the lens 1004. The processor 1014 activates a voltage supply 1010 in order to change the shape or curvature of the lens 1004, thereby increasing or decreasing a focus distance of the lens 1004 or lens system 1000. The processor 1014 can use the same methods of determining the distance to the object as discussed above with respect to FIG. 9 and can apply an amount of voltage that is selected to distort the lens 1004 in order to focus an image of the object at the determined distance on the photosensitive array 1002.

Figure 11:
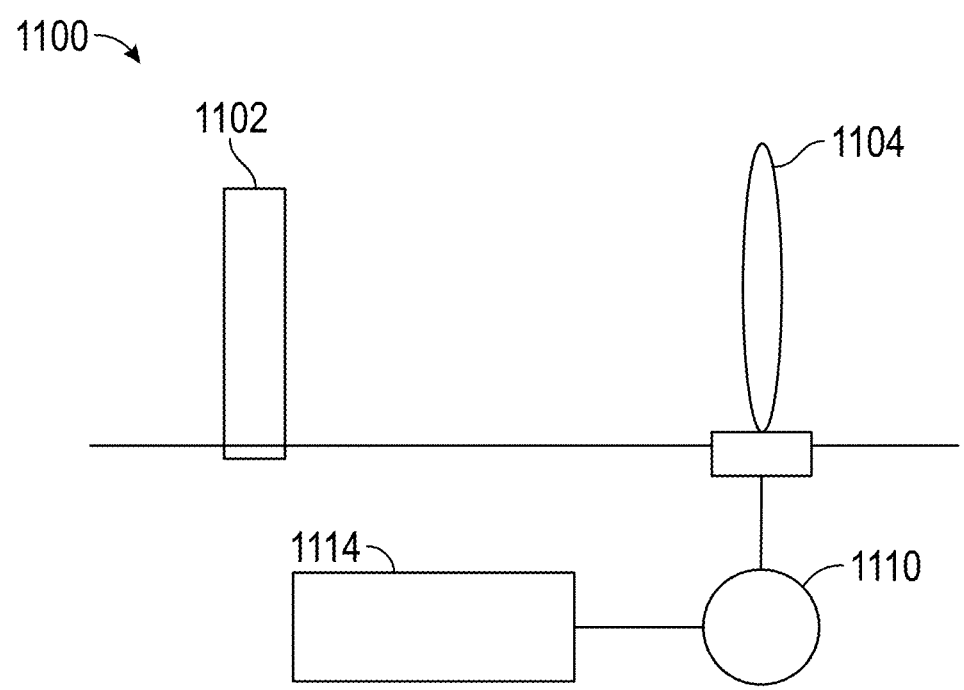
FIG. 11 shows a system for adjusting a focal length of a lens system in accordance with another embodiment.

FIG. 11 shows another alternate method for adjusting a focus distance of a lens system 1100. The lens system 1100 is shown having only a single lens 1104 for illustrative purposes. However, it is to be understood that lens system 1100 can have any number of lenses. The lens system 1100 includes a lens 1104 that has an adjustable index of refraction, such as a liquid crystal lens. The index of refraction is dependent upon an applied voltage across the lens 1104. The processor 1114 activates a voltage supply 1110 in order to change the index of refraction of the lens 1104, thereby increasing or decreasing a focus distance of the lens 1104 or lens system 1100. The processor 1114 can use the same methods of determining the distance to the object as discussed above with respect to FIG. 9 and can apply an amount of voltage that is selected to change the index of refraction of the lens 1104 in order to focus an image of the object at the determined distance on the photosensitive array.

Figure 12:
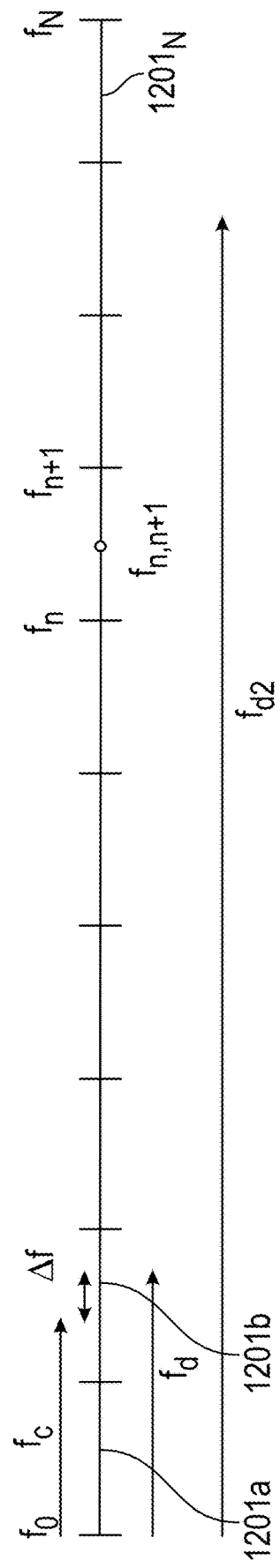
FIG. 12 illustrates a focal range of the illustrative lens systems of FIGS. 9-11.

FIG. 12 illustrates a focal range of the illustrative lens systems of FIGS. 9-11. The lens range is indicated by a minimum focus distance $f_0$ at one end and a maximum focus distance $f_N$ at the other end. In various embodiments, the maximum focus distance $f_N$ can be at infinity. The minimum focus distance $f_0$ and maximum focus distance $f_N$ can be properties of the lens system. The focal range is used to illustrate two methods for adjusting a focus of the lens system. A first method is used when the current focus distance $f_c$ is relatively close to an optimal focus distance $f_d$ at which at object is in focus. In this scenario, the 3D measurement device is already able to perform 3D measurements of the object at the current focus distance G. The difference between the current focus distance $f_c$ and the optimal focus distance $f_d$ is given by $\Delta f$. In one embodiment, the optimal focus distance $f_d$ can be determined and the necessary change $\Delta f$ for the current focus distance can be determined so that the processor can make the necessary adjustments to the focus distance to reduce $\Delta f$ to zero. Alternatively, the processor can determine a sharpness of an image of the object and make necessary alterations to the lens system to increase the sharpness of the image.

A second method is used when the current focus distance $f_c$ is considerably different from a second optimal focus distance $f_{d2}$. In this scenario, the 3D measurement device is unable to perform 3D measurements using the current focus distance, G. The processor can change the focus in rough steps until a 3D measurement is possible. For example, the processor can divide the focal range into a plurality of focal regions $1201_a$, $1201_b$, ... $1201_N$. The processor then alters the focus distance of the lens system in order to coincide with a selected focal region, for example, by selecting a focus distance in the middle of the focal region, such as focus distance $f_{n,n+1}$ which is in the middle of the focal range having endpoints defined by focus distances $f_n$ and $f_{n+1}$. If a 3D measurement cannot be made at that focus distance (e.g., $f_{n,n+1}$), the processor changes the focus distance to coincide with a next, or adjacent, focal region. This processor continues until the focus distance is within a focal region at which 3D measurements can be obtained. The processor then changes the focus distance of the lens system using the methods for smaller focus distance adjustments discussed above in order to locate the second optimal focus distance, $f_{d2}$.

In order to achieve a suitable focus of the lens system, the focus distance of the lens system is calibrated to an applied voltage. This calibration of focus distance to voltage applies for each of the lens systems of FIGS. 9-11. In one embodiment, the focus distance is calibrated by determining a voltage level at which an image at a selected distance is maximally sharp. This calibration uses a reading of the locations of the lenses on the lens track (as in FIG. 9) and a determination of the sharpness of the image at different focus distance using an image sharpness method at the processor. The calibration of the location of the lenses on the track to voltage readings can therefor provide a calibration of voltages to a focal length of the lens system and/or a calibration of voltages to a position of the lens system on the track, thereby leading a calibration of voltages to a focus distance of the lens system. In another embodiment, the calibration uses a reading of the applied voltage levels and the sharpness of the image at different focus distance. In one embodiment, calibration associates a selected applied voltage level to a selected focus distance. In another embodiment, calibration associates a selected applied voltage level to a distance at which the image is sharp. For focus distances that do not have an associated calibration voltage, interpolation methods can be used in order to provide a voltage level that provides these focus distances. In addition to calibrating the focus distances as a function of voltage, the lens distortion as a function of focal length can be calibrated to the voltage. In various embodiments, calibrating the focus distance to a voltage includes calibrating a parameter of the lens system to the voltage. Exemplary parameters include a principal point, a distortion, a focal length, an orientation, a position, etc.

In another aspect, the cameras of the measuring device 100 includes adjustable apertures that allow the cameras to adjust a depth of field of the camera. Adjusting the depth of field can be useful in providing sharpness of an image at a selected focus distance. Thus, each camera has the ability to adjust its scanning range using the adjustable aperture.

The depth of field that can be used to image an object is dependent on a level of light intensity. The aperture size that can be chosen is dependent on the level of light intensity and the depth of field can be determined for the aperture size. Subsequently, the aperture size can be selected by measuring a level of light intensity and a required depth of field at the measured level of light intensity and determining a selected aperture size for the measured level of light intensity and the required depth of field. The aperture can then be automatically adjust to the selected aperture size. In one embodiment, the photodetector array or photosensitive array 1302 can be used as a light intensity meter.

For low light intensities (such as with surrounding light or structure light illumination), one generally uses as large an aperture as possible. For high light intensities (such as close up scanning with a strong light reflection of an illumination light source), one can either reduce the exposure time or reduce the aperture. Reducing the exposure time in response to higher light intensities generally retains a smaller depth of field. However, reducing the aperture obtain a large depth of field and thus large scanning ranges.

FIG. 13 shows a camera system 1300 that includes an adjustable aperture 1312. The camera system 1300 further includes a photosensitive array 1302 and a lens 1304. It is understood that even though a single lens 1304 is shown, the camera system 1300 can include more than one lens. In one embodiment, an adjustable aperture 1312 is located between the lens 1304 and the photosensitive array 1302 (as shown in FIG. 13) in order to control an intensity level of the image and to control a depth of field of the camera system 1300. In another embodiment, the aperture 1312 can be on the outside of the lens 1304, i.e., with the lens 1304 between the aperture 1312 and the photosensitive array 1302. The aperture 1312 can be controlled by a voltage signal provided by processor 1310.

The aperture 1312 can be adjusted based on a distance to an object, which can be determined by distance measurement device 1310. However, the aperture 1312 can be controlled based on a measured light level, which can be provided by light detector 1308. When there is sufficient light, the aperture 1312 can be reduced in order to expand the depth of field. When the distance to the object is known, the distance can be used to determine whether it is more desirable to reduce the aperture (giving a larger depth of field) or reduce the exposure time (allowing for faster movements of the handheld scanning). The aperture 1312 can be calibrated to a voltage level, so that a selected aperture setting is selected by applying a selected voltage level to the aperture 1312. In addition, any lens distortion as a function of aperture can be calibrated to the voltage. Interpolation can be used to obtain an aperture setting that is between calibrated aperture settings. In various embodiments, calibrating the aperture to a voltage includes calibrating a parameter of the lens system, such as principal point, a distortion, a focal length, an orientation, a position, for example, to the voltage.

While the calibration of voltages to focus distances and calibration of voltages to aperture sizes have been discussed separately, in various embodiments, the plurality of voltages can be calibrated to select both focus distances and aperture sizes. Thus, voltages can be applied to select a focus distance and aperture size simultaneously.

In various embodiments, a sharpness setting of a first camera of the 3D scanner can be transferred to a second camera in order to set the sharpness setting at the second camera. The voltages that are applied at the first camera to select the focus distance and/or aperture size at the first camera can be supplied to the second camera. Alternatively, the set of voltages that are applied at the camera to select the focus distance and/or aperture size at the first camera can be translated into an equivalent set of voltages for selecting suitable focus distance and/or aperture size at the second camera. Translating the set of voltages can be useful when, for example, the first camera has a different light sensitivity than the second camera. Thus the focus distance and/or aperture size of the second camera can be selected that forms an image at an image plane of the second camera of the object. The first camera and second camera can then both be used to scan object using their respective focus distances and/or aperture sizes.

It should be appreciated that changing either the focus distance or the aperture may change the calibration of the 3D scanner. In an embodiment, the 3D scanner automatically calibrates for each frame acquired. In another embodiment, the 3D scanner calibrates on a periodic or aperiodic basis. In still another embodiment, the calibration is performed each time the focus distance or the aperture is changed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of scanning an object with a three-dimensional (3D) scanner, comprising:
   measuring a level of light intensity at a first camera of the 3D scanner; and
   automatically adjusting an aperture of the first camera of the 3D scanner to a first aperture size based on the measured level of light intensity.

2. The method of claim 1, further comprising calibrating a plurality of aperture sizes to a plurality of aperture voltage levels and selecting an aperture voltage level to adjust the aperture to the first aperture size.

3. The method of claim 1, further comprising using interpolation and at least two calibrated aperture sizes to determine a voltage value that produces an uncalibrated aperture size.

4. The method of claim 2, further comprising calculating depth of fields for the plurality of aperture sizes and automatically selecting an aperture size based on both a measured light intensity and a depth of field.

5. The method of claim 1, further comprising:
   adjusting an aperture of a second camera of the 3D scanner to a second aperture size based on the first aperture size of the first camera; and
   scanning the object using the first camera and the second camera.

6. The method of claim 5, further comprising determining a first voltage applied to the first camera to obtain the first aperture size, determining an equivalent voltage from the first voltage that obtains the second aperture size at the second camera, and applying the equivalent voltage as a second voltage at the second camera.

7. The method of claim 1, further comprising calibrating a parameter of a lens system selected from the group consisting of: (i) principal point; (ii) lens distortion; (iii) focal length; (iv) first camera orientation; and (v) first camera position to a plurality of aperture voltages.

8. A three-dimensional (3D) scanning apparatus, comprising:
   a light intensity meter for measuring a level of light intensity at a first camera of the 3D scanning apparatus;
   the first camera having an adjustable aperture; and a processor configured to adjust the adjustable aperture of the first camera automatically based on the measured light level.

9. The apparatus of claim 8, wherein the processor is further configured to calibrate a plurality of aperture sizes to a plurality of aperture voltage levels and select an aperture voltage level to adjust the aperture to the first aperture size.

10. The apparatus of claim 8, wherein the processor is further configured to use interpolation and at least two calibrated aperture sizes to determine a voltage value that produces an uncalibrated aperture size.

11. The apparatus of claim 9, wherein the processor is further configured to calculate depth of fields for the plurality of aperture sizes and automatically select an aperture size based on both a measured light intensity and a depth of field.

12. The apparatus of claim 8, wherein the processor is further configured to:

adjust an aperture of a second camera of the 3D scanner to a second aperture size based on the first aperture size of the first camera; and scan the object using the first camera and the second camera.

13. The apparatus of claim 12, wherein the processor is further configured to determine a first voltage applied to the first camera to obtain the first aperture size, determine an equivalent voltage from the first voltage that obtains the second aperture size at the second camera, and apply the equivalent voltage as a second voltage at the second camera.

14. The apparatus of claim 8, wherein the processor is further configured to calibrate a parameter of a lens system selected from the group consisting of: (i) principal point; (ii) lens distortion; (iii) focal length; (iv) first camera orientation; and (v) first camera position to a plurality of aperture voltages.

15. The apparatus of claim 8, wherein the light intensity meter comprises a photodetector array of the first camera.

* * * * *